(12) United States Patent  (10) Patent No.: US 11,549,472 B2
Yagi                      (45) Date of Patent:     Jan. 10, 2023

(54) STRADDLE-TYPE VEHICLE

(71) Applicant: SUZUKI MOTOR CORPORATION, Hamamatsu (JP)

(72) Inventor: Toshiaki Yagi, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 111 days.

(21) Appl. No.: 17/213,315

(22) Filed: Mar. 26, 2021

(65) Prior Publication Data

US 2021/0301772 A1  Sep. 30, 2021

(30) Foreign Application Priority Data

Mar. 27, 2020 (JP) .............................. JP2020-057817

(51) Int. Cl.
  *B62K 19/30* (2006.01)
  *F02M 35/16* (2006.01)
  *F02M 35/04* (2006.01)

(52) U.S. Cl.
  CPC ........ *F02M 35/162* (2013.01); *F02M 35/044* (2013.01); *F02M 35/048* (2013.01)

(58) Field of Classification Search
  CPC . B62K 11/04; B62J 43/28; B62J 43/00; B62J 43/16; F02M 35/021; F02M 35/02
  See application file for complete search history.

(56) References Cited

U.S. PATENT DOCUMENTS

| 2006/0061157 A1* | 3/2006 | Yokomizo ................. B62J 1/12 297/214 |
| 2006/0065456 A1 | 3/2006 | Noda |
| 2017/0057583 A1 | 3/2017 | Yokoyama |
| 2019/0152556 A1* | 5/2019 | Yamamoto ................. B62J 1/08 |

FOREIGN PATENT DOCUMENTS

| CN | 109018139 A   * | 12/2018 | ............. B62K 11/04 |
| DE | 102017219422 A1 * | 5/2018  | ............. B62J 35/00 |
| EP | 2821332 A1    * | 1/2015  | ............. B62K 11/04 |
| JP | S6010209 Y2   * | 4/1985  | |
| JP | S61207250 A   * | 9/1986  | |
| JP | H05193542 A   * | 1/1992  | |
| JP | H07115665 B2  * | 12/1995 | |

(Continued)

OTHER PUBLICATIONS

Office Action issued in Indian Application No. 202114013083 dated Feb. 8, 2022.

*Primary Examiner* — George C Jin
*Assistant Examiner* — Teuta B Holbrook
(74) *Attorney, Agent, or Firm* — Troutman Pepper Hamilton Sanders LLP

(57) ABSTRACT

There is provided a straddle-type vehicle, including: a pair of seat frames; a seat; an air cleaner; a battery; and a bracket. A rear portion of the air cleaner and the battery are positioned below the seat. The battery is disposed above the rear portion of the air cleaner. The bracket extends in a left-right direction of the straddle-type vehicle and passes between the rear portion of the air cleaner and the battery. A left end side and a right end side of the bracket are connected to the pair of seat frames respectively. The rear portion of the air cleaner is suspended by the bracket. The battery is installed on the bracket.

9 Claims, 8 Drawing Sheets

(56) References Cited

FOREIGN PATENT DOCUMENTS

| JP | 2534075 Y2 | * | 4/1997 | |
|---|---|---|---|---|
| JP | H09207849 A | * | 8/1997 | |
| JP | 2003200871 A | * | 7/2003 | |
| JP | 2003267282 A | * | 9/2003 | |
| JP | 2011020603 A | * | 2/2011 | |
| JP | 2012-201318 A | | 10/2012 | |
| JP | 2013203091 A | * | 10/2013 | |
| JP | 2014083995 A | * | 5/2014 | |
| JP | 2017-047752 A | | 3/2017 | |
| JP | 2019099116 A | * | 6/2019 | ............. B62J 43/00 |
| WO | WO-2011121757 A1 | * | 10/2011 | ............. B60K 1/00 |

* cited by examiner

STRADDLE-TYPE VEHICLE

CROSS-REFERENCE TO RELATED APPLICATION

This application is based on Japanese Patent Application No. 2020-057817 filed on Mar. 27, 2020, the contents of which are incorporated herein by way of reference.

BACKGROUND

The present invention relates to a straddle-type vehicle, and more particularly to an arrangement and attachment of an air cleaner and a battery, and the like.

For example, a straddle-type vehicle such as a motorcycle includes an air cleaner that purifies air for fuel combustion and a battery that serves as a power source of electric components. In a straddle-type vehicle including a single cylinder or a parallel multi-cylinder engine, the air cleaner is often disposed below a fuel tank, which is disposed in front of a seat, and behind a cylinder head of the engine or above a cylinder head cover. Further, the battery is often disposed behind the air cleaner and below the seat. Further, as disclosed in JP-A-2012-201318, there is also a motorcycle in which a battery is disposed on a lateral side of an air cleaner.

When a width of the engine and a width of a frame supporting the engine are reduced in the straddle-type vehicle due to the request of reducing a size of the straddle-type vehicle or adoption of a new vehicle design, or the like, a space behind the cylinder head and above the cylinder head cover is reduced below the fuel tank. As a result, it is necessary to reduce capacity of the air cleaner disposed below the fuel tank and behind the cylinder head or above the cylinder head cover. However, in order to supply a sufficient amount of air to the engine, it is not preferable to reduce the capacity of the air cleaner.

On the other hand, when the air cleaner is expanded rearward in order to secure the capacity of the air cleaner, it is essential to move the battery disposed behind the air cleaner rearward. However, from the viewpoint of setting the center of gravity of the straddle-type vehicle near a center of the vehicle to increase running stability, it is not preferable to dispose the battery, which is a heavy object, at a position far away from the center of the vehicle to rearward.

Further, in a case where the air cleaner is disposed below the seat and the battery is disposed on the lateral side of the air cleaner as in the motorcycle disclosed in JP-A-2012-201318, it is essential to reduce a width of the air cleaner in order to secure a space for disposing the battery on the lateral side of the air cleaner, and as a result, the capacity of the air cleaner is reduced.

SUMMARY

The present invention has been made in view of the above problems, and an object of the present invention is to provide a straddle-type vehicle capable of avoiding a reduction in capacity of an air cleaner and capable of bringing a battery close to a center of the vehicle, even when it is difficult to secure a large space below a fuel tank and behind a cylinder head or above a cylinder head cover.

In order to solve the above problems, the present invention provides a straddle-type vehicle, including: an engine; a support frame that supports the engine; a pair of seat frames that are disposed on a left portion and a right portion of the straddle-type vehicle respectively and that extend rearward from a rear portion of the support frame; a seat that is provided above the pair of seat frames; an air cleaner that is disposed between the pair of seat frames; a battery that is disposed between the pair of seat frames; and a bracket that supports a rear portion of the air cleaner and the battery on the straddle-type vehicle. The rear portion of the air cleaner and the battery are positioned below the seat. The battery is disposed above the rear portion of the air cleaner. The bracket extends in a left-right direction of the straddle-type vehicle and passes between the rear portion of the air cleaner and the battery. A left end side and a right end side of the bracket are connected to the pair of seat frames respectively. The rear portion of the air cleaner is suspended by the bracket. The battery is installed on the bracket.

DETAILED DESCRIPTION

A straddle-type vehicle according to an embodiment of the present invention includes: an engine; a support frame that supports the engine; a pair of seat frames that are provided at a left portion and a right portion of the straddle-type vehicle respectively and that extend rearward respectively from a rear portion of the support frame; a seat that is provided above the pair of seat frames; an air cleaner that is disposed between the pair of seat frames; a battery that is disposed between the pair of seat frames; and a bracket that supports a rear portion of the air cleaner and the battery on the straddle-type vehicle.

In the present embodiment, the rear portion of the air cleaner and the battery are positioned below the seat, and the battery is disposed above the rear portion of the air cleaner.

The bracket extends in a left-right direction, passes between the rear portion of the air cleaner and the battery, and a left end side and a right end side of the bracket are respectively connected to the pair of seat frames. The rear portion of the air cleaner is suspended by the bracket, and the battery is installed on the bracket.

According to the present embodiment, while the air cleaner is lengthened in a front-rear direction, it is possible to prevent the battery from being disposed further rearward than the seat. Therefore, even when a space behind a cylinder head and a space above a cylinder head cover are extremely small below a fuel tank, reduction in capacity of the air cleaner can be avoided, and the battery can be brought close to a center in the front-rear direction and the left-right direction of the straddle-type vehicle. Therefore, a sufficient amount of air can be supplied to the engine through the air cleaner, and the center of gravity of the straddle-type vehicle can be set near the center of the vehicle to enhance running stability.

Further, according to the present embodiment, it is possible to support both the rear portion of the air cleaner and the battery by one bracket, thereby simplifying a support structure and reducing the number of components, and improving assemblability of the air cleaner and the battery to the vehicle.

A straddle-type vehicle according to an embodiment of the present invention will be described with reference to the drawings. In the description of the embodiment, for convenience of description, directions of front (Fd), rear (Bd), left (Ld), right (Rd), up (Ud), and down (Dd) follow arrows drawn at a lower right portion of each drawing.

Figure 1:
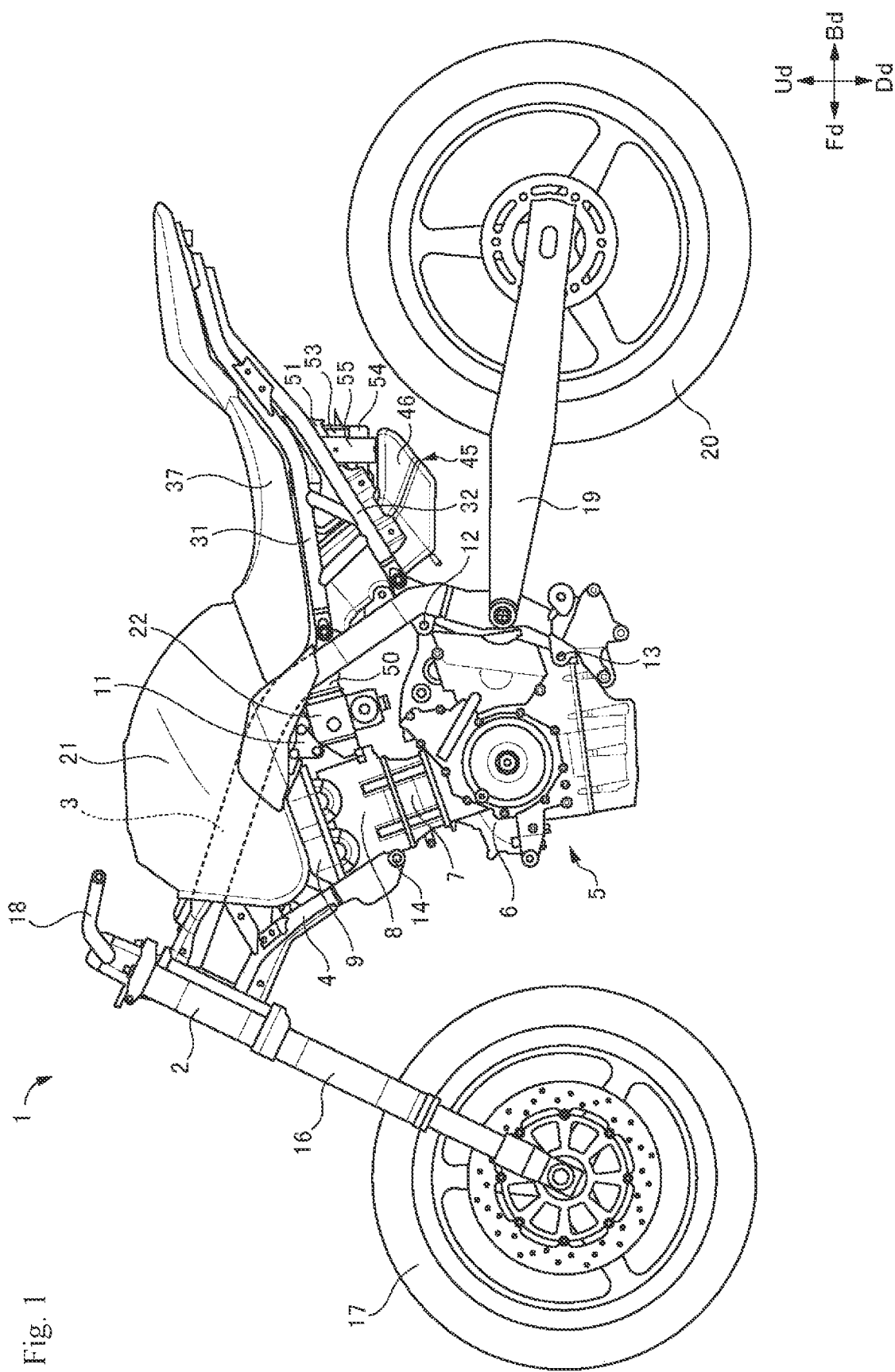
FIG. 1 is an illustrative view showing a straddle-type vehicle according to an embodiment of the present invention as viewed from the left.

FIG. 1 shows a straddle-type vehicle 1 according to the embodiment of the present invention as viewed from the left. In FIG. 1, the straddle-type vehicle 1 is, for example, a motorcycle. The straddle-type vehicle 1 includes a head pipe 2, two main frames 3, two down frames 4, and an engine 5. The head pipe 2 is disposed at a front upper portion of the straddle-type vehicle 1. The two main frames 3 are respectively disposed at a left portion and a right portion of the straddle-type vehicle 1 (see FIG. 3 for the right main frame 3). The two main frames 3 extend rearward from an upper portion of the head pipe 2, then bend downward near a center in a front-rear direction of the straddle-type vehicle 1, and then extend downward. The main frame 3 is a specific example of a support frame. The two down frames 4 are respectively disposed at the left portion and the right portion of the straddle-type vehicle 1, and extend downward and rearward from a lower portion of the head pipe 2 (the right down frame is not illustrated).

The engine 5 is a parallel two-cylinder gasoline engine, and includes a crankcase 6, a cylinder 7, a cylinder head 8, and a cylinder head cover 9. The cylinder 7 is provided above the crankcase 6, the cylinder head 8 is provided above the cylinder 7, and the cylinder head cover 9 is provided above the cylinder head 8. The engine 5 is supported by the two main frames 3 and the two down frames 4. Specifically, in the engine 5, a left rear portion of the cylinder head 8 and an upper portion and a lower portion of a left rear portion of the crankcase 6 are respectively connected to three mount portions 11, 12, and 13 provided on the left main frame 3, and a left front portion of the cylinder head 8 is connected to a mount portion 14 provided on the left down frame 4. Similarly, a right rear portion of the cylinder head 8 and an upper portion and a lower portion of a right rear portion of the crankcase 6 are respectively connected to three mount portions provided on the right main frame 3, and a right front portion of the cylinder head 8 is connected to a mount portion provided on the right down frame.

A steering shaft is rotatably supported on the head pipe 2, a front fork 16 is supported on the steering shaft, and a front wheel 17 is rotatably supported on the front fork 16. Further, a handle 18 is supported on an upper portion of the steering shaft. A swing arm 19 is swingably supported on a rear lower portion of the two main frames 3, and a rear wheel 20 is rotatably supported on the swing arm 19. Further, a fuel tank 21 is provided at an upper portion of the two main frames 3. The fuel tank 21 is positioned above the engine 5.

Figure 2:
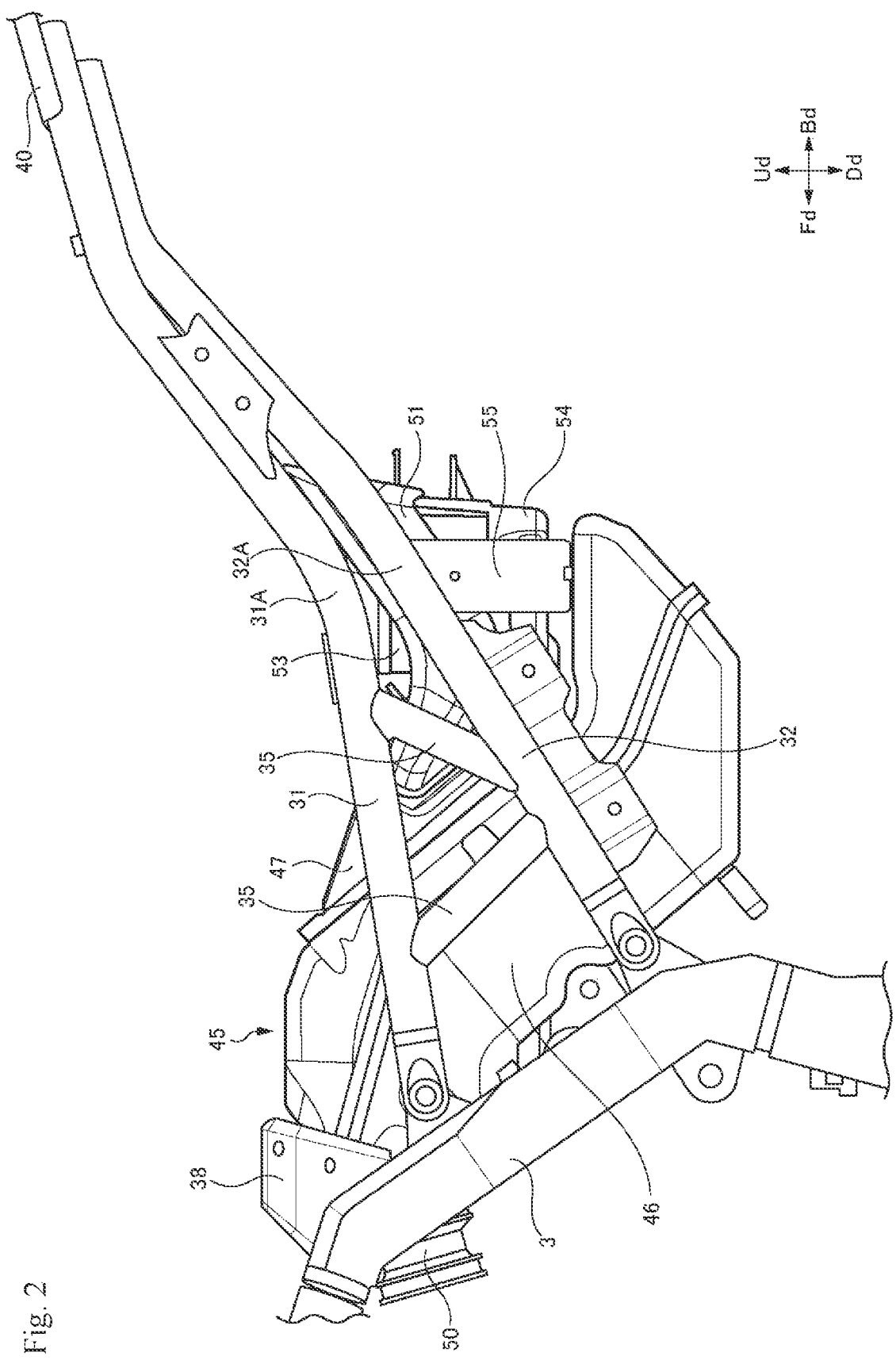
FIG. 2 is an illustrative view showing a rear upper portion of the straddle-type vehicle according to the embodiment of the present invention as viewed from the left.
Figure 3:
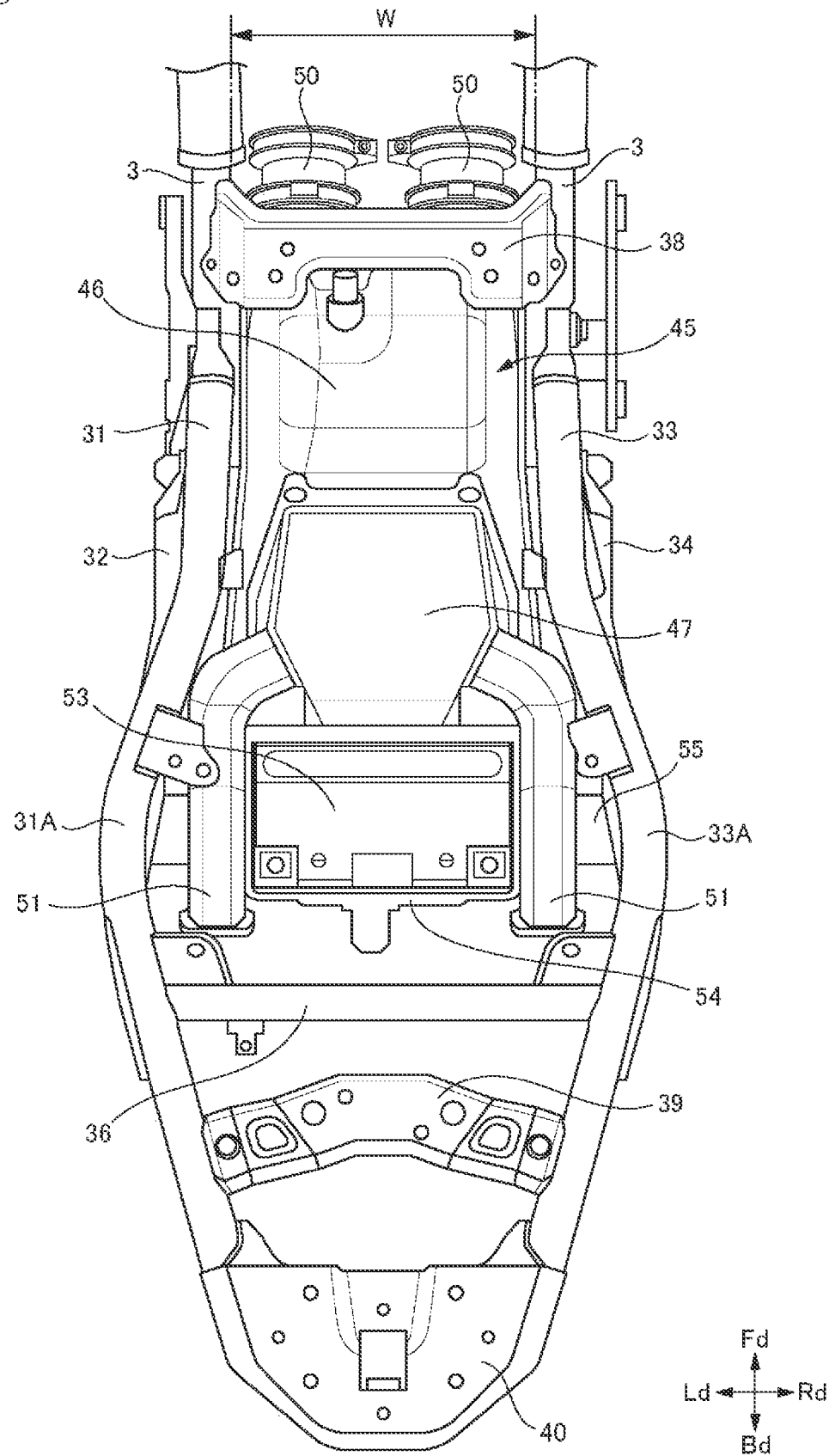
FIG. 3 is an illustrative view showing the rear upper portion of the straddle-type vehicle according to the embodiment of the present invention as viewed from above.
Figure 4:
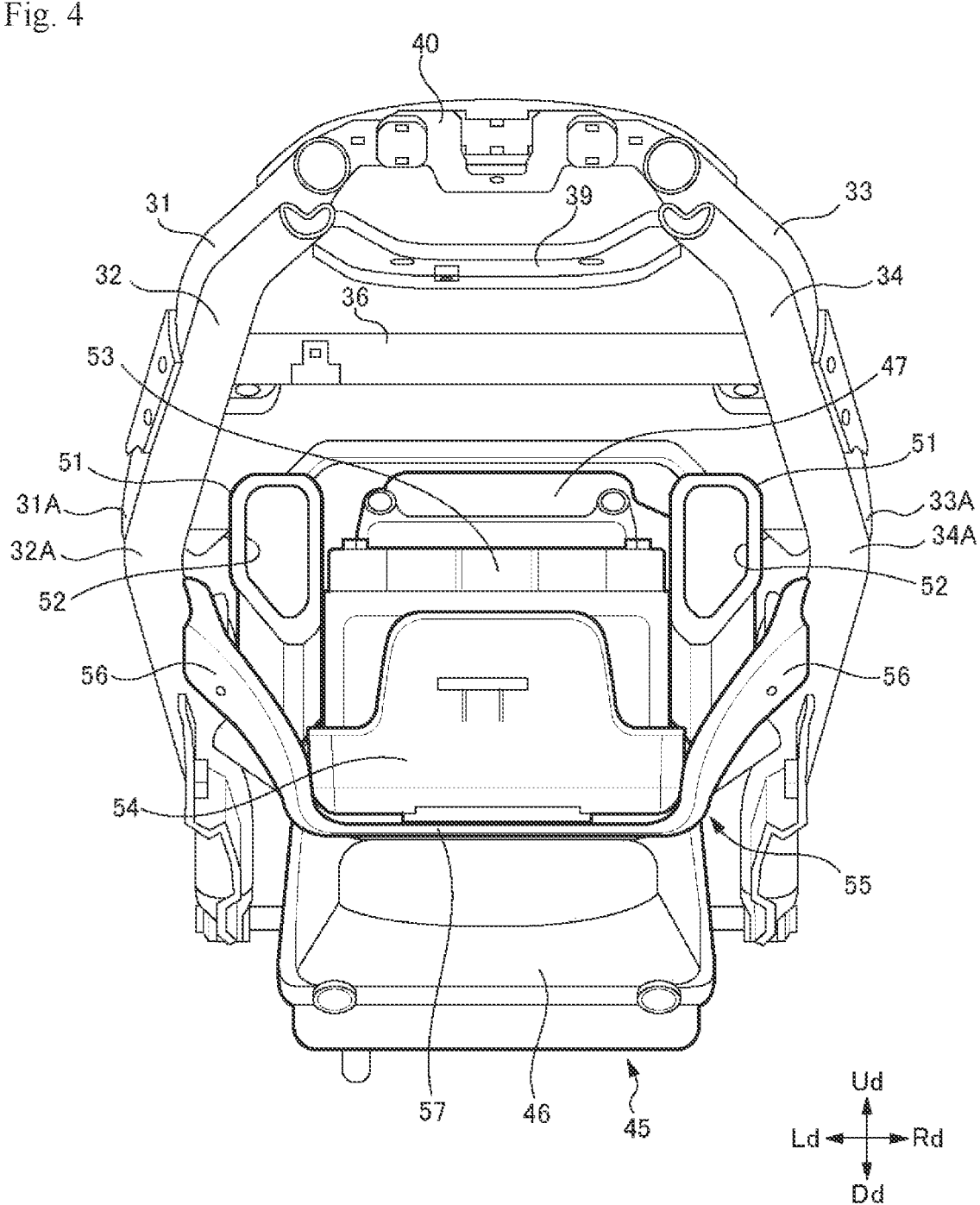
FIG. 4 is an illustrative view showing the rear upper portion of the straddle-type vehicle according to the embodiment of the present invention as viewed from behind.

FIG. 2 shows a rear upper portion of the straddle-type vehicle 1 as viewed from the left. FIG. 3 shows the rear upper portion of the straddle-type vehicle 1 as viewed from above. FIG. 4 shows the rear upper portion of the straddle-type vehicle 1 as viewed from behind. As shown in FIGS. 2 to 4, the straddle-type vehicle 1 includes an upper left seat frame 31, a lower left seat frame 32, an upper right seat frame 33, a lower right seat frame 34, a seat 37, an air cleaner 45, two inlet tubes 51, a battery 53, a battery holder 54, and a bracket 55.

As shown in FIG. 2, the upper left seat frame 31 and the lower left seat frame 32 are disposed at a rear portion of an upper left portion of the straddle-type vehicle 1, and extend rearward from a rear portion of the left main frame 3. The upper left seat frame 31 and the lower left seat frame 32 are inclined such that rear end sides thereof are higher than front end sides thereof. A front end portion of the upper left seat frame 31 is connected to a rear upper portion of the left main frame 3. A front end portion of the lower left seat frame 32 is connected to a rear portion of the left main frame 3, between a portion to which the front end portion of the upper left seat frame 31 is connected and a portion to which a front end portion of the swing arm 19 is connected. The rear end side of the upper left seat frame 31 and the rear end side of the lower left seat frame 32 are coupled to each other. A reinforcing frame 35 is provided between the upper left seat frame 31 and the lower left seat frame 32 to connect the upper left seat frame 31 and the lower left seat frame 32.

The upper right seat frame 33 and the lower right seat frame 34 are disposed at a rear portion of an upper right portion of the straddle-type vehicle 1, and extend rearward from a rear portion of the right main frame 3. The upper right seat frame 33 and the lower right seat frame 34 are provided substantially symmetrically with respect to the upper left seat frame 31 and the lower left seat frame 32, and are similar to the upper left seat frame 31 and the lower left seat frame 32 in shape, arrangement, connection, and provision of reinforcing frames. As shown in FIG. 4, a reinforcing frame 36 is provided between the upper left seat frame 31 and the upper right seat frame 33 to connect the upper left seat frame 31 and the right upper seat frame 33.

As shown in FIG. 3, in the straddle-type vehicle 1, a gap W between the rear portion of the left main frame 3 and the rear portion of the right main frame 3 is substantially equal to a width of the cylinder head 8 of the engine 5. As a result, a gap between the front end portion of the upper left seat frame 31 and the front end portion of the upper right seat frame 33, which are connected to the rear portions of the two main frames 3, and a gap between the front end portion of the lower left seat frame 32 and the front end portion of the lower right seat frame 34, which are connected to the rear portions of the two main frames 3, are substantially equal to the width of the cylinder head 8 of the engine 5.

At a substantially central portion in the front-rear direction of the upper left seat frame 31, an overhanging portion 31A that overhangs to an outer side (left side) in a left-right direction than the front end portion and a rear end portion of the upper left seat frame 31, is formed. Similarly, the lower left seat frame 32 is formed with an overhanging portion 32A. Further, at a substantially central portion in the front-rear direction of the upper right seat frame 33, an overhanging portion 33A that overhangs to an outer side (right side) in the left-right direction than the front end portion and a rear end portion of the upper right seat frame 33, is formed. Similarly, the lower right seat frame 34 is formed with an overhanging portion 34A. A gap between the overhanging portion 31A of the upper left seat frame 31 and the overhanging portion 33A of the upper right seat frame 33 is larger than the gap between the front end portion of the upper left seat frame 31 and the front end portion of the upper right seat frame 33, that is, larger than the width of the cylinder head 8 of the engine 5. Similarly, a gap between the overhanging portion 32A of the lower left seat frame 32 and the overhanging portion 34A of the lower right seat frame 34 is larger than the gap between the front end portion of the lower left seat frame 32 and the front end portion of the lower right seat frame 34, that is, larger than the width of the cylinder head 8 of the engine 5.

As shown in FIG. 1, the seat 37 is provided above the upper left seat frame 31 and the upper right seat frame 33. As shown in FIG. 3, a support plate 38 for supporting a front portion of the seat 37 on the main frames 3 is provided at the rear upper portions of the two main frames 3. At rear end side portions of the upper left seat frame 31 and the upper right seat frame 33, a support plate 39 for supporting a rear portion of the seat 37 on the seat frames 31 to 34 is provided. Further, at rear end portions of the upper left seat frame 31 and the upper right seat frame 33, a support plate 40 for supporting components disposed at a rear end portion of the straddle-type vehicle 1 is provided.

Figure 5:
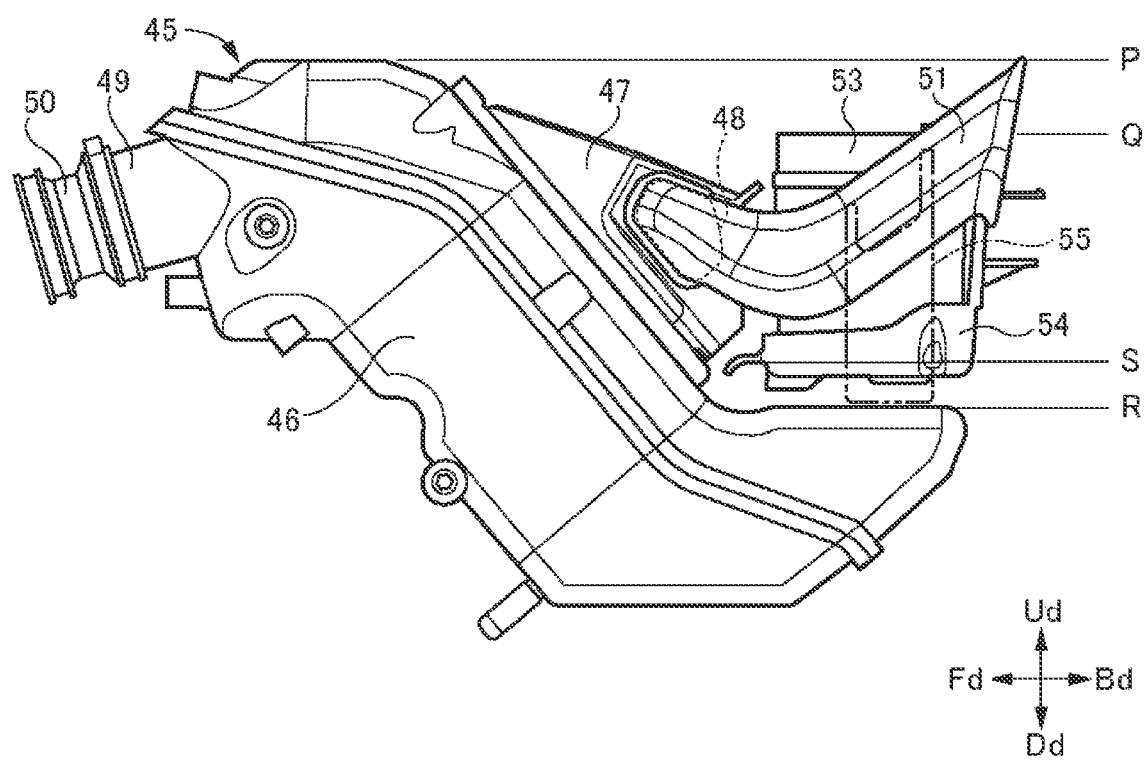
FIG. 5 is an illustrative view showing an air cleaner, an inlet tube, a battery, a battery holder and a bracket in the straddle-type vehicle according to the embodiment of the present invention as viewed from the left.
Figure 6:
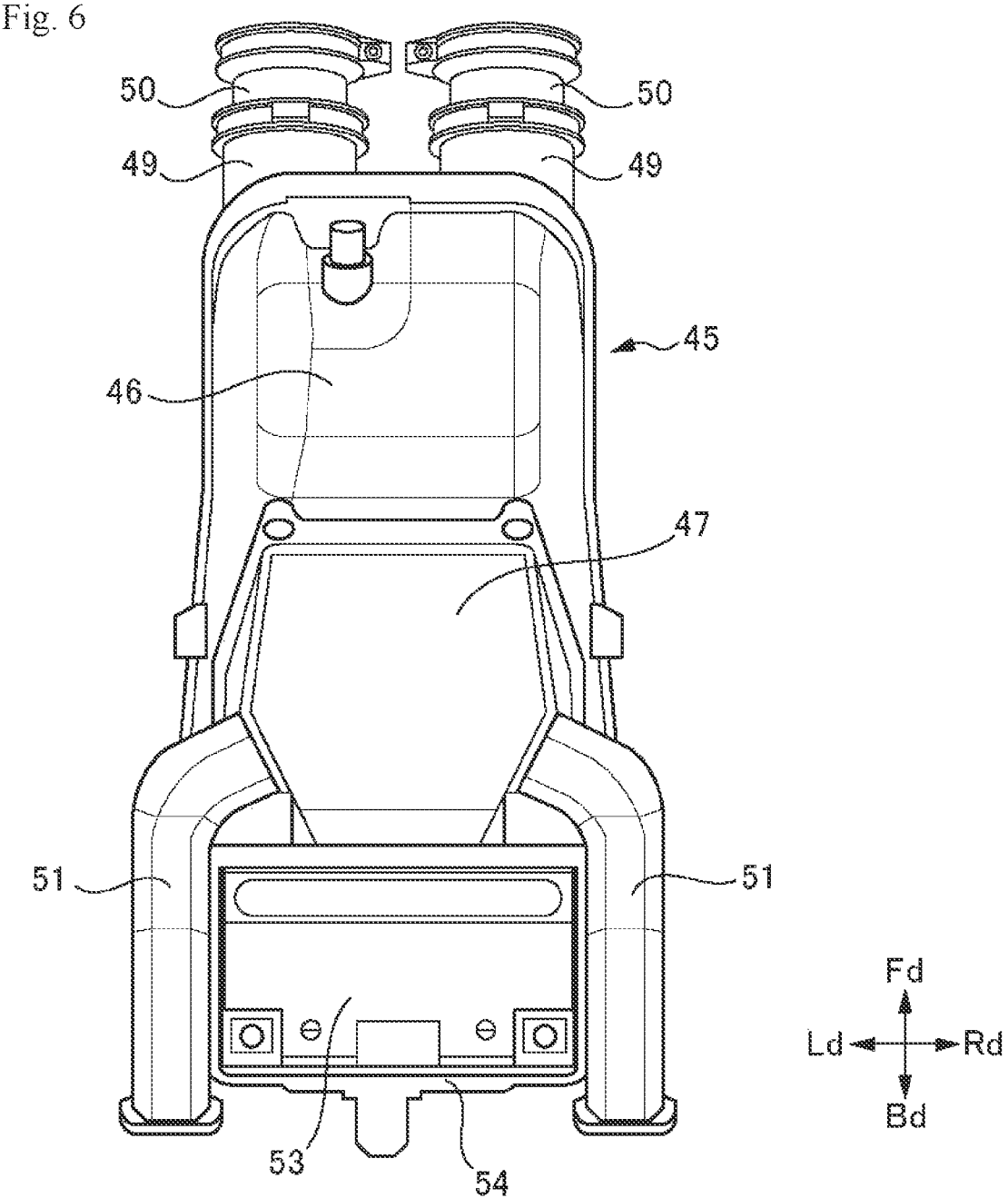
FIG. 6 is an illustrative view showing the air cleaner, the inlet tube, the battery, the battery holder and the bracket in the straddle-type vehicle according to the embodiment of the present invention as viewed from above.
Figure 7:
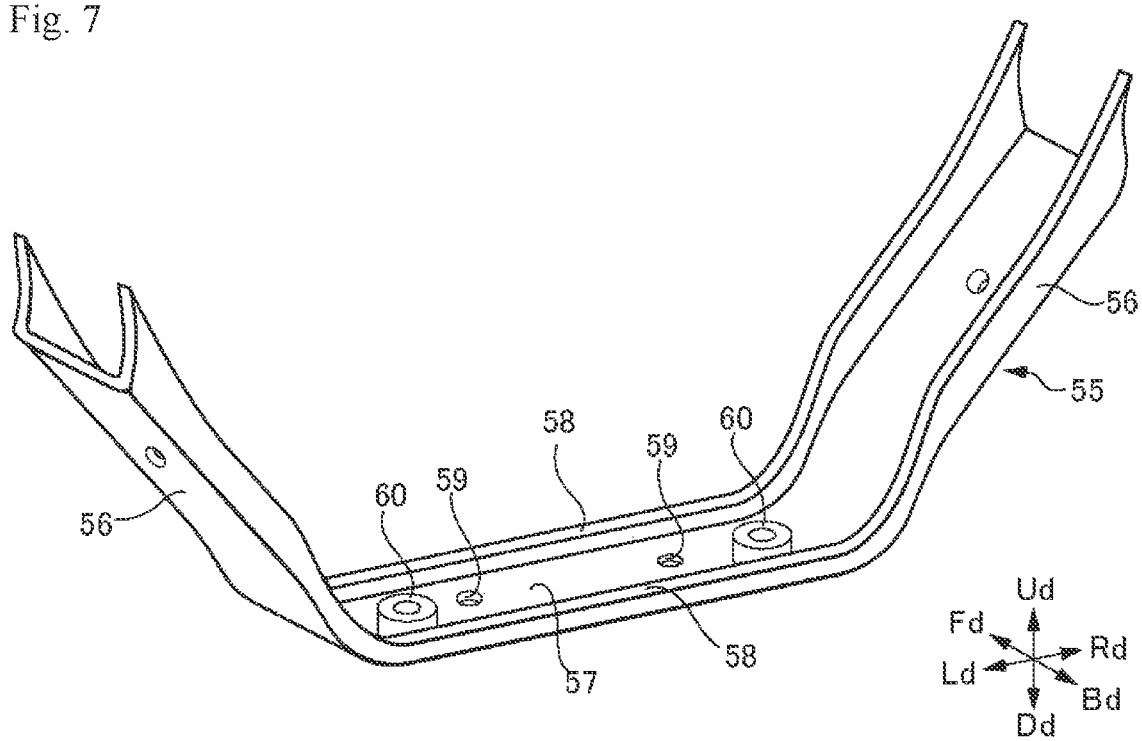
FIG. 7 is a perspective view showing the bracket in the straddle-type vehicle according to the embodiment of the present invention as viewed from a left rear side.

The air cleaner 45, the two inlet tubes 51, the battery 53, the battery holder 54, and the bracket 55 are disposed, as a whole, between the upper left seat frame 31 and the lower left seat frame 32 and between the upper right seat frame 33 and the lower right seat frame 34. Here, FIG. 5 shows the air cleaner 45, the inlet tube 51, the battery 53, the battery holder 54, and the bracket 55 as viewed from the left. In FIG. 5, only an outer shape of the bracket 55 is indicated by a two-dot chain line in order to show a left surface and the like of the battery 53. FIG. 6 shows the air cleaner 45, the inlet tube 51, the battery 53, the battery holder 54, and the bracket 55 as viewed from above. FIG. 7 shows the bracket 55 as viewed from a left rear side.

The air cleaner 45 has a function of purifying air for fuel combustion that is to be supplied to the engine 5. As shown in FIG. 5, the air cleaner 45 includes a cleaner case 46 and an air filter cover 47.

The cleaner case 46 is formed in a box shape long in the front-rear direction. The air filter cover 47 is attached substantially at a center of an upper portion of the cleaner case 46. The air filter cover 47 is formed in a substantially bowl shape that is upside down, and covers a connection hole formed substantially at the center of the upper portion of the cleaner case 46 from above. An inner portion of the air filter cover 47 and an inner portion of the cleaner case 46 communicate with each other via the connection hole. Further, an inflow port 48 is formed in each of a left portion and a right portion of the air filter cover 47. An air filter is disposed between the inflow port 48 and the connection hole in the inner portion of the air filter cover 47.

An outflow port 49 is formed in a front portion of the cleaner case 46. Two outflow ports 49 are formed in accordance with the number of cylinders of the engine 5. A joint 50 for connecting the outflow port 49 to a throttle body 22 (see FIG. 1) connected to a suction port formed in the cylinder head 8 of the engine 5 is attached to each outflow port 49.

The two inlet tubes 51 are members for introducing air into the air cleaner 45. Each inlet tube 51 is formed in a tubular shape. The two inlet tubes 51 are respectively disposed on the left and right sides above a rear portion of the cleaner case 46. A front end portion of the left inlet tube 51 is connected to the inflow port 48 formed in the left portion of the air filter cover 47. The left inlet tube 51 extends leftward from the left inflow port 48, curves backward, and then extends rearward. A front end portion of the right inlet tube 51 is connected to the inflow port 48 formed in the right portion of the air filter cover 47. The right inlet tube 51 extends rightward from the right inflow port 48, curves rearward, and then extends rearward. An inlet port 52 positioned at a rear end of each inlet tube 51 opens rearward as shown in FIG. 4, and is positioned between the seat 37 and a tire of the rear wheel 20 as shown in FIG. 1.

When the engine 5 is operated and the throttle valve is open, the air passes through each inlet tube 51 from each inlet port 52, enters the air filter cover 47 from each inflow port 48, enters the cleaner case 46 through the air filter and the connection hole, enters each throttle body 22 from each outflow port 49, and is supplied to the engine 5.

The battery 53 functions as a power source of electric components of the straddle-type vehicle 1, and has a substantially rectangular parallelepiped outer shape. The battery holder 54 is a member that supports the battery 53, and is generally formed in a box shape with an open upper portion. A lower portion of the battery 53 is inserted into the battery holder 54, and is fixed to the battery holder 54 using, for example, a rubber band. The battery 53 is detachable from the battery holder 54, and when replacing the battery 53, for example, the battery 53 can be removed from the battery holder 54 by removing the rubber band.

As shown in FIG. 1, the throttle body 22 is disposed below the fuel tank 21 and right behind the cylinder head 8 of the engine 5. A front end portion (a portion where the outflow port 49 is provided) of the cleaner case 46 that is connected to the throttle body 22 via the joint 50, is positioned below a lower portion of the fuel tank 21 and between the rear upper portions of the two main frames 3. The cleaner case 46 extends rearward from between the rear upper portions of the two main frames 3, enters between the upper left seat frame 31 and the lower left seat frame 32 and between the upper right seat frame 33 and the lower right seat frame 34, and then extends further rearward while being inclined downward. The rear portion of the cleaner case 46 reaches a lower side of the seat 37. The rear portion of the cleaner case 46 is positioned to be lower than the lower left seat frame 32 and the lower right seat frame 34. The cleaner case 46 is disposed at a center in the left-right direction of the straddle-type vehicle 1.

The battery 53 and the battery holder 54 are disposed below the seat 37. The battery 53 and the battery holder 54 are disposed at the center in the left-right direction above the rear portion of the cleaner case 46. As shown in FIG. 5, the cleaner case 46 is obliquely disposed such that the rear portion thereof is positioned lower than the front portion thereof, and an upper surface of the rear portion of the cleaner case 46 is lower than an upper surface of the front portion of the cleaner case 46. The battery 53 and the battery holder 54 are disposed above the upper surface of the rear portion that is positioned at a low position in the cleaner case 46 as described. As can be seen from FIG. 5, a position P of the upper surface of the front portion of the cleaner case 46 is higher than a position Q of an upper surface of the battery, and a position R of the upper surface of the rear portion of the cleaner case 46 is lower than a position S of a lower surface of the battery 53. As shown in FIG. 2, the battery 53 does not protrude upward from the upper left seat frame 31 and the upper right seat frame 33. Further, as shown in FIG. 4, a left surface of the battery 53 and a left surface of the battery holder 54 are positioned on an inner side in the left-right direction relative to a left surface of the cleaner case 46, and a right surface of the battery 53 and a right surface of the battery holder 54 are positioned on an inner side in the left-right direction relative to a right surface of the cleaner case 46.

As shown in FIGS. 2 to 4, a rear end side of the left inlet tube 51 passes between the lower left seat frame 32 and the left surface of the battery 53 and extends rearward, and the left inlet port 52 is positioned substantially at the same position as a rear surface of the battery 53 or further rearward than the rear surface of the battery 53. Similarly, a rear end side of the right inlet tube 51 passes between the lower right seat frame 34 and the right surface of the battery 53 and extends rearward, and the right inlet port 52 is positioned substantially at the same position as the rear surface of the battery 53 or further rearward than the rear surface of the battery 53. Both of the two inlet ports 52 are accommodated between the left seat frames 31 and 32 and the right seat frames 33 and 34.

Further, in a top view of the straddle-type vehicle 1 as shown in FIG. 3, the rear portion of the cleaner case 46, the battery 53, the battery holder 54, and the two inlet tubes 51 are positioned between the overhanging portions 31A and 32A of the upper left seat frame 31 and the lower left seat frame 32 and the overhanging portions 33A and 34A of the upper right seat frame 33 and the lower right seat frame 34.

The bracket 55 is a member that supports the rear portion of the cleaner case 46 and the battery 53 on the straddle-type vehicle 1, specifically, on the lower left seat frame 32 and the lower right seat frame 34. The bracket 55 is made of, for example, a metal material, and is formed in a plate shape that is curved in a substantially U shape as a whole as shown in FIG. 7.

Specifically, the bracket 55 has two support portions 56 that extend in an up-down direction, and a bridge portion 57 that extends in the left-right direction and connects lower end portions of the two support portions 56. The two support portions 56 extend obliquely so as to approach each other while extending downward.

At a front edge portion and a rear edge portion of the bracket 55, ribs 58 are formed respectively in order to improve strength of the bracket 55. Each rib 58 extends from a left end of the left support portion 56 to a right end of the right support portion 56 across the bridge portion 57.

Further, the bracket 55 includes two insertion holes 59 as an air cleaner attachment portion for attaching the rear portion of the cleaner case 46, and two fixing members 60 as a holder attachment portion for attaching the battery holder 54. The two insertion holes 59 and the two fixing members 60 are provided in the bridge portion 57. Each insertion hole 59 penetrates the bridge portion 57 in the up-down direction. Each fixing member 60 is formed in a cylindrical shape, and a screw is formed on an inner peripheral surface thereof. A lower surface of each fixing member 60 is fixed to an upper surface of the bridge portion 57 by a joining method such as welding.

The two fixing members 60 are disposed on a left portion and a right portion of the bridge portion 57 respectively. The two insertion holes 59 are disposed in the left portion and the right portion of the bridge portion 57 respectively. The two insertion holes 59 are disposed between the two fixing members 60. That is, when comparing positions of the insertion holes 59 with positions of the fixing members 60, the insertion holes 59 are positioned on inner sides in the left-right direction of the bridge portion 57, and the fixing members 60 are positioned on outer sides in the left-right direction of the bridge portion 57. In the present embodiment, the positions of the insertion holes 59 are slightly deviated from the positions of the fixing members 60 in the front-rear direction. The fixing members 60 are positioned further rearward than the insertion holes 59 in the straddle-type vehicle 1.

As shown in FIG. 4, a left end portion of the bracket 55, more specifically, a left end portion (upper end portion) of the left support portion 56 is connected to and fixed to the lower left seat frame 32. A right end portion of the bracket 55, more specifically, a right end portion (upper end portion) of the right support portion 56 is connected to and fixed to the lower right seat frame 34. For example, the left end portion of the bracket 55 is welded to an outer surface (a left surface or a lower left surface), of the lower left seat frame 32, facing inward in the left-right direction of the straddle-type vehicle 1, and the right end portion of the bracket 55 is welded to an outer surface (a right surface or a lower right surface), of the lower right seat frame 34, facing inward in the left-right direction of the straddle-type vehicle 1.

The bracket 55 passes between a rear portion of the air cleaner 45 and the battery 53, the rear portion of the air cleaner 45 is suspended by the bracket 55, and the battery 53 is installed on the bracket. Specifically, the bridge portion 57 of the bracket 55 passes between the upper surface of the rear portion of the cleaner case 46 and a lower surface of the battery holder 54. The upper surface of the rear portion of the cleaner case 46 is attached to a lower surface side of the bridge portion 57, and the lower surface of the battery holder 54 is attached to an upper surface side of the bridge portion 57.

Figure 8:
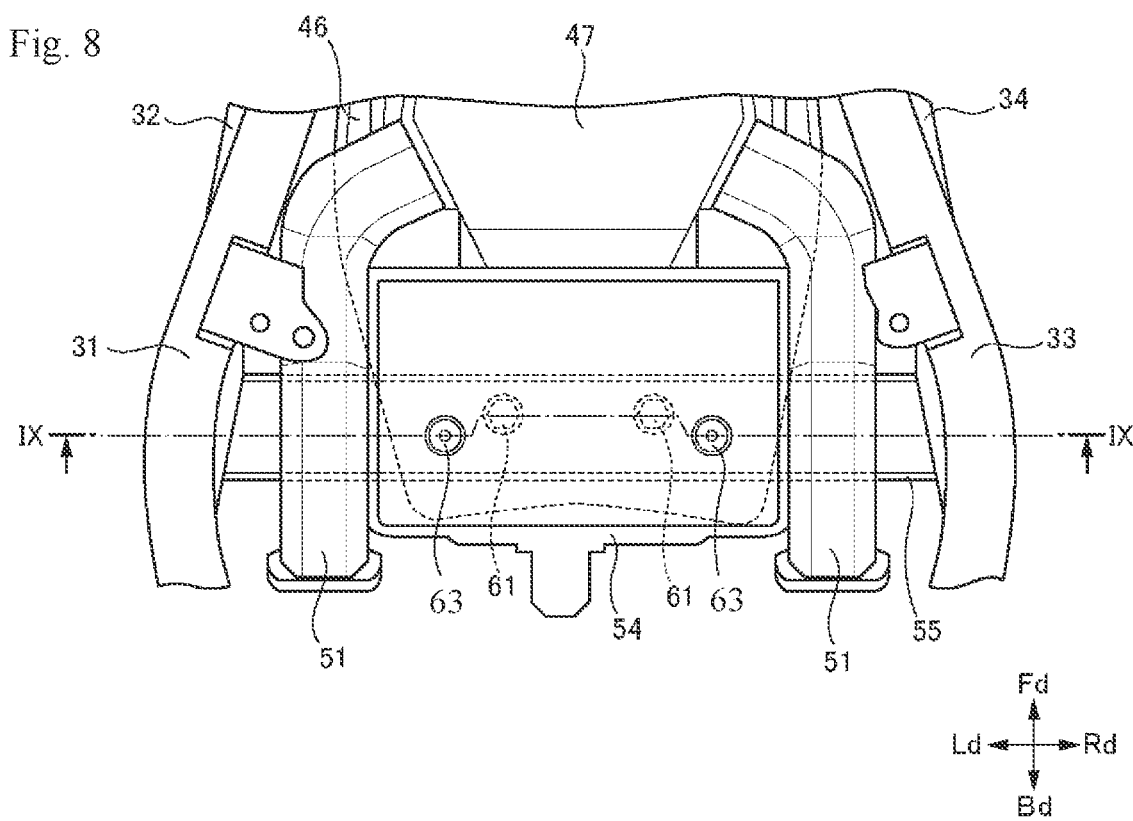
FIG. 8 is an illustrative view showing a rear portion of a cleaner case, the bracket, the battery holder, two inlet tubes, and four seat rails in the straddle-type vehicle according to the embodiment of the present invention as viewed from above.
Figure 9:
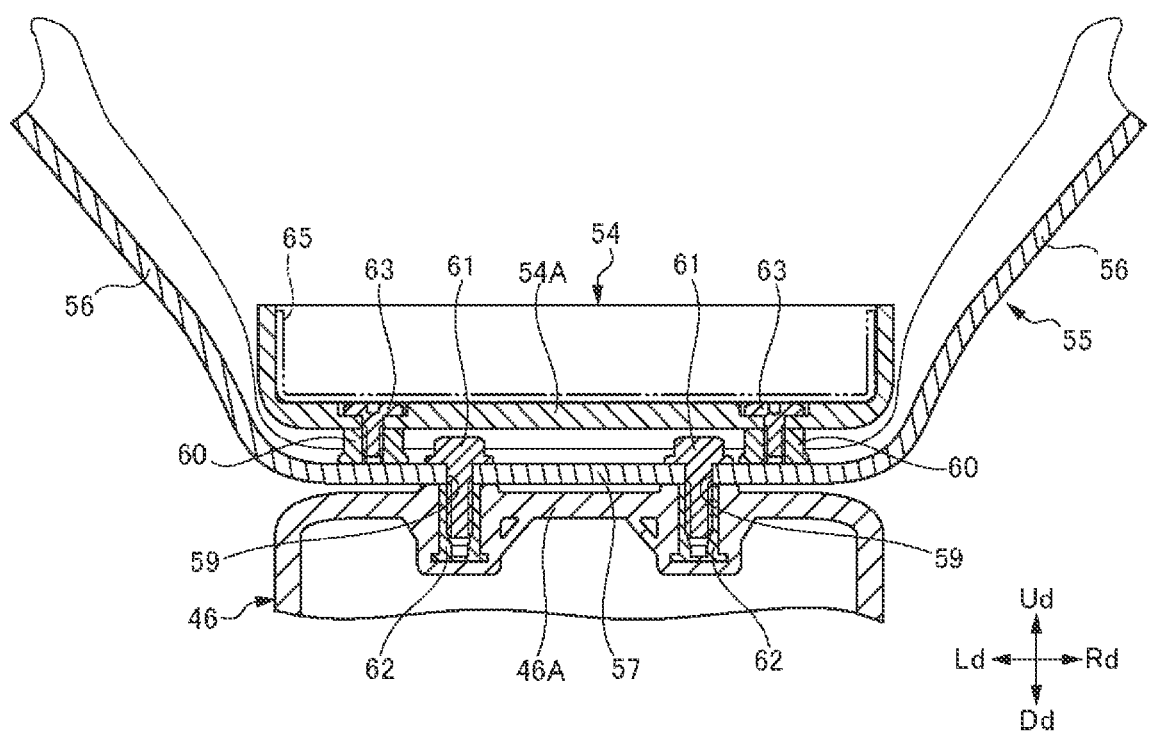
FIG. 9 is a cross-sectional view showing a cross-section of the rear portion of the cleaner case, the bracket and the battery holder cut along a cutting line IX-IX in FIG. 8, as viewed from behind.

Here, FIG. 8 shows the rear portion of the cleaner case 46, the bracket 55, the battery holder 54, the two inlet tubes 51, and the four seat frames 31 to 34 as viewed from above. The battery 53 is removed in FIG. 8. FIG. 9 shows a cross-section of the rear portion of the cleaner case 46, the bracket 55 and the battery holder 54 cut along a cutting line IX-IX in FIG. 8, as viewed from behind.

As shown in FIG. 9, the rear portion of the cleaner case 46 is fixed to the bridge portion 57 of the bracket 55 using two bolts 61 and two nuts 62. That is, an upper wall 46A of the rear portion of the cleaner case 46 is formed such that the upper surface thereof is horizontal. Further, the nuts 62 are respectively fixed at positions corresponding to the two insertion holes 59 in the upper wall 46A of the rear portion of the cleaner case 46. For example, an insert nut is used as the nut 62. In a state where the bridge portion 57 and the upper wall 46A of the rear portion of the cleaner case 46 are vertically overlapped, the two bolts 61 are inserted into the insertion holes 59 from above the bridge portion 57, and tip end side portions (lower end side portions) of the bolts 61 are fastened by the nuts 62. The rear portion of the cleaner case 46 is fixed to the bridge portion 57 by fastening of the two bolts 61 and the two nuts 62.

The battery holder 54 is fixed by the two fixing members 60, which are fixed to the bridge portion 57 of the bracket 55, by using two bolts 63. That is, at positions corresponding to the two fixing members 60 in a lower wall 54A (bottom plate portion) of the battery holder 54, through holes penetrating the lower wall 54A in the up-down direction are formed. In a state where the battery holder 54 is placed on the bridge portion 57, the two bolts 63 are inserted into the through holes formed in the battery holder 54 from above the battery holder 54, and are fastened to inner peripheral sides of the fixing members 60. By fastening of the two bolts 63 and the two fixing members 60, the battery holder 54 is fixed to the bridge portion 57.

When attaching the rear portion of the cleaner case 46 and the battery holder 54 to the bridge portion 57 of the bracket 55 in the straddle-type vehicle 1 at the time of manufacturing or maintenance of the straddle-type vehicle 1, first, the rear portion of the cleaner case 46 is attached to the bridge portion 57 using the bolts 61, and thereafter the battery holder 54 is attached to the bridge portion 57 using the bolts 63.

As shown in FIGS. 2 and 4, in a state where the rear portion of the cleaner case 46 and the battery holder 54 are supported by the lower left seat frame 32 and the lower right seat frame 34 via the bracket 55 and the battery 53 is inserted into the battery holder 54, the battery 53 and the two inlet tubes 51 are positioned between the two support portions 56 of the bracket 55.

As described above, in the straddle-type vehicle 1 of the present embodiment, the rear portion of the air cleaner 45 (the cleaner case 46) and the battery 53 are positioned below the seat 37, between the upper left seat frame 31 and the lower left seat frame 32 and between the upper right seat frame 33 and the lower right seat frame 34, the battery 53 is disposed above the rear portion of the air cleaner 45, and the rear portion of the air cleaner 45 and the battery 53 are supported by the lower left seat frame 32 and the lower right seat frame 34 via the bracket 55. According to this configuration, the air cleaner 45 (the cleaner case 46) can be extended in the front-rear direction from a position right behind the throttle body 22 disposed below the fuel tank 21 (right behind the cylinder head 8 of the engine 5) to the lower side of the seat 37, and the battery 53 can be prevented from being disposed rearward than the lower side of the seat 37. Accordingly, even when a width of the engine 5 is small and a width between the rear portions of the two main frames 3 supporting the engine 5 is set narrowly to be substantially equal to the width of the engine 5, and therefore a space behind the cylinder head 8 and a space above the cylinder head cover 9 are small below the fuel tank 21, reduction of capacity of the air cleaner 45 can be avoided and the battery 53 can be brought close to the center in the front-rear direction and the left-right direction of the straddle-type vehicle 1. Therefore, a sufficient amount of air can be supplied to the engine 5 through the air cleaner 45, and the center of gravity of the straddle-type vehicle 1 can be set near the center of the vehicle to improve running stability.

In the bracket 55 of the straddle-type vehicle 1 of the present embodiment, the upper end portions of the two support portions 56 are respectively attached to the lower left seat frame 32 and the lower right seat frame 34, the bridge portion 57 extends in the left-right direction and passes between the rear portion of the air cleaner 45 and the battery 53, the rear portion of the air cleaner 45 is suspended by the bridge portion 57, and the battery 53 is installed on the bridge portion 57 via the battery holder 54. As described above, according to the present embodiment, since both the rear portion of the air cleaner 45 and the battery 53 can be supported by one bracket 55, the support structure for the air cleaner 45 and the battery 53 can be simplified, and the number of components required for supporting the air cleaner 45 and the battery 53 can be reduced. Therefore, it is possible to reduce the size and weight of the straddle-type vehicle 1. Further, by attaching the rear portion of the cleaner case 46 and the battery holder 54 to one bracket 55, it is possible to improve assemblability of the air cleaner 45 and the battery holder 54 to the vehicle.

The bracket 55 includes the two support portions 56 that extend in the up-down direction and the bridge portion 57 that connects the lower end portions of the two support portions 56, and the rear portion of the air cleaner 45 is suspended by the bridge portion 57. With this configuration, a suspension position of the rear portion of the air cleaner 45 can be lowered, and a space for installing the battery 53 between the rear portion of the air cleaner 45 and the seat 37 can be secured.

The battery 53 and the two inlet tubes 51 are disposed between the two support portions 56 of the bracket 55. According to this configuration, the battery 53 and the inlet tubes 51 can be protected by the support portions 56. For example, it is possible to prevent the battery 53 or the inlet tube 51 from being damaged due to a force applied from a lateral side to the rear upper portion of the straddle-type vehicle 1 when the straddle-type vehicle 1 is turned over due to falling or the like.

The two support portions 56 of the bracket 55 approach each other while extending downward. With this configuration, the strength of the bracket 55 and the seat frames 31 to 34 can be increased, and the rear portion of the straddle-type vehicle 1 can be slimmed to improve the design of the vehicle.

In the bridge portion 57 of the bracket 55, the two insertion holes 59 for attaching the rear portion of the air cleaner 45 are disposed between the two fixing members 60 for attaching the battery holder 54. According to this configuration, the two fixing members 60 can be greatly separated from each other in the left-right direction, and stability of installation of the battery 53 having a heavy weight can be enhanced. Further, by deviating the positions of the two fixing members 60 in the left-right direction from the positions of the two insertion holes 59 in the left-right direction at the bridge portion 57, the positions of the two fixing members 60 in the front-rear direction can be brought close to the positions of the two insertion holes 59 in the front-rear direction or be the same as the positions of the two insertion holes 59 in the front-rear direction. Thus, a width of the bridge portion 57 in the front-rear direction can be reduced.

The cleaner case 46 is formed in a box shape that is long in the front-rear direction, and is obliquely disposed such that the rear portion thereof is positioned lower than the front portion thereof. With this configuration, the capacity of the air cleaner 45 can be increased in the straddle-type vehicle in which the space below the fuel tank 21 is small. A shape and arrangement of the cleaner case 46 are set such that the upper surface of the front portion of the cleaner case 46 is higher than the upper surface of the battery 53 and the upper surface of the rear portion of the cleaner case 46 is lower than the lower surface of the battery 53. With this configuration, a sufficient space for placing the battery 53 can be secured between the rear portion of the air cleaner 45 and the seat 37.

Further, by expanding the cleaner case 46 to reach the overhanging portions 31A to 34A of the seat frames 31 to 34, the capacity of the air cleaner 45 can be increased. Further, since the rear portion of the cleaner case 46 is positioned between the overhanging portions 31A and 32A and between the overhanging portions 33A and 34A in a top view of the straddle-type vehicle 1, the inlet tubes 51 and the battery 53 can be arranged collectively at one portion efficiently.

Further, the two inlet tubes 51 are provided, one inlet tube 51 passes between the left seat frames 31, 32 and the battery 53 and extends rearward, and the other inlet tube 51 passes between the right seat frames 33, 34 and the battery 53 and extends rearward. By distributing the two inlet tubes 51 on both sides of the battery 53 as described above, even when the inlet tubes 51 and the battery 53 are collectively arranged at one portion, a sufficient suction port area can be secured, and a sufficient amount of air supply to the engine 5 can be secured. The inlet port 52 of each inlet tube 51 can face a large space behind the inlet tube 51, and air with little dust can be sucked.

Although the bracket 55 is connected to the lower left seat frame 32 and the lower right seat frame 34 in the above embodiment, the bracket 55 may be connected to the upper left seat frame 31 and the upper right seat frame 33. Further, although the bracket 55 is directly connected to the seat frame, the bracket 55 may be connected to the seat frame via a reinforcing frame, a bridge, or the like fixed to the seat frame. The method of connecting the bracket 55 is not limited to welding.

The shape of the bracket 55 is not limited to a plate shape curved in a U shape. For example, when the lower left seat frame 32 and the lower right seat frame 34 are at a low position of the vehicle, a straight bracket may be provided between the seat frames 32 and 34. In addition, the bracket may be formed in a rod shape. In this case, the fixing of the bracket and the cleaner case and the fixing of the bracket and the battery holder are preferably implemented using a U-shaped support member such as a pipe clamp.

Further, a protector 65 for protecting the battery 53 may be provided in an inner portion of the battery holder 54 as indicated by the two-dot chain line in FIG. 9. The protector 65 is, for example, a cushion that suppresses rattling of the battery 53 placed in the battery holder 54 due to vibration during running.

Although the case where two seat frames 31 and 32 are provided on the left portion of the straddle-type vehicle 1 and two seat frames 33 and 34 are provided on the right portion thereof is taken as an example in the above embodiment, one seat frame may be provided on the left portion of the straddle-type vehicle 1 and one seat frame may be provided on the right portion thereof. Although the case where two main frames 3 are provided in the straddle-type vehicle 1 is taken as an example in the above embodiment, one main frame may be provided. In addition, although the case where the seat frame is connected to the rear portion of the main frame is taken as an example in the above embodiment, the seat frame may be connected to a frame other than the main frame that supports the engine.

The engine of the straddle-type vehicle of the present invention is not limited to a two-cylinder engine, and may be a single-cylinder engine. The present invention is also applicable to a straddle-type vehicle in which an engine having three or more cylinders is provided.

The straddle-type vehicle of the present invention is not limited to a two-wheeled straddle-type vehicle such as a motorcycle, and can also be applied to a three-wheeled straddle-type vehicle, or a four-wheeled straddle-type vehicle such as a buggy car. The straddle-type vehicle of the present invention also includes a scooter.

The present invention can be modified as appropriate without departing from the idea or spirit of the invention which can be read from the claims and the entire specification, and a straddle-type vehicle to which such a change is applied is also included in the technical idea of the present invention.

What is claimed is:

1. A straddle-type vehicle, comprising:
an engine;
a support frame that supports the engine;
a pair of seat frames that are disposed on a left portion and a right portion of the straddle-type vehicle respectively and that extend rearward from a rear portion of the support frame;
a seat that is provided above the pair of seat frames;
an air cleaner that is disposed between the pair of seat frames;
a battery that is disposed between the pair of seat frames; and
a bracket that supports a rear portion of the air cleaner and the battery on the straddle-type vehicle,
wherein the rear portion of the air cleaner and the battery are positioned below the seat, the battery is disposed above the rear portion of the air cleaner, the bracket extends in a left-right direction of the straddle-type vehicle and passes between the rear portion of the air cleaner and the battery, a left end side and a right end side of the bracket are connected to the pair of seat frames respectively, the rear portion of the air cleaner is suspended by the bracket, and the battery is installed on the bracket.

2. The straddle-type vehicle according to claim 1, wherein the bracket includes two support portions that extend in an up-down direction of the straddle-type vehicle and a bridge portion that extends in the left-right direction and that connects lower end sides of the two support portions, upper end sides of the two support portions are connected to the pair of seat frames respectively, the bridge portion passes between the rear portion of the air cleaner and the battery, the rear portion of the air cleaner is suspended by the bridge portion, and the battery is installed on the bridge portion.

3. The straddle-type vehicle according to claim 2, wherein the battery is positioned between the two support portions.

4. The straddle-type vehicle according to claim 2, wherein the two support portions approach each other while extending downward.

5. The straddle-type vehicle according to claim 1, wherein the bracket includes an air cleaner attachment portion for attaching the rear portion of the air cleaner, and two holder attachment portions for attaching a battery holder that supports the battery, and in the bracket, the two holder attachment portions are disposed at different positions in the left-right direction and the air cleaner attachment portion is disposed between the two holder attachment portions.

6. The straddle-type vehicle according to claim 1, wherein the air cleaner is formed in a box shape that extends in a front-rear direction of the straddle-type vehicle, and is obliquely disposed such that the rear portion of the air cleaner is positioned lower than a front portion of the air cleaner; a position of an upper surface of the front portion of the air cleaner is higher than a position of an upper surface of the battery; and a position of an upper surface of the rear portion of the air cleaner is lower than a position of a lower surface of the battery.

7. The straddle-type vehicle according to claim 1,
wherein at a central portion in a front-rear direction of each of the seat frames, an overhanging portion that overhangs to an outer side in the left-right direction than a front end portion and a rear end portion of the seat frame is formed, and in a top view of the straddle-type vehicle, the rear portion of the air cleaner and the battery are positioned between the overhanging portions of the pair of seat frames.

8. The straddle-type vehicle according to claim 1, further comprising:
two inlet tubes for introducing air into the air cleaner,
wherein front end portions of the two inlet tubes are connected to the air cleaner, a rear end side of one inlet tube of the two inlet tubes passes between a left seat frame of the pair of seat frames and the battery and extends rearward, and a rear end side of the other inlet tube of the two inlet tubes passes between a right seat frame of the pair of seat frames and the battery and extends rearward.

9. The straddle-type vehicle according to claim 1, further comprising:
a pair of the support frames that support a left portion and a right portion of the engine respectively,
wherein the engine is a single-cylinder engine or a two-cylinder engine, a left seat frame of the pair of seat frames is connected to a rear portion of one support frame of the pair of the support frames that supports a left portion of the engine, a right seat frame of the pair of seat frames is connected to a rear portion of the other support frame of the pair of the support frames that supports a right portion of the engine, and a gap between the pair of support frames is equal to a width of a cylinder head of the engine.

* * * * *